United States Patent
Zhang et al.

(10) Patent No.: US 9,722,821 B2
(45) Date of Patent: Aug. 1, 2017

(54) CHANNEL STATE INFORMATION TRANSMISSION METHOD, APPARATUS AND SYSTEM

(71) Applicant: Huawei Technologies Co., Ltd., Shenzhen (CN)

(72) Inventors: Gong Zhang, Shenzhen (CN); Xun Yang, Shenzhen (CN); Pei Xiao, Shenzhen (CN); Zihuai Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 14/661,876

(22) Filed: Mar. 18, 2015

(65) Prior Publication Data

US 2015/0195109 A1    Jul. 9, 2015

Related U.S. Application Data

(60) Division of application No. 13/329,027, filed on Dec. 16, 2011, now Pat. No. 9,025,683, which is a
(Continued)

(30) Foreign Application Priority Data

Sep. 1, 2009    (CN) .......................... 2009 1 0091940

(51) Int. Cl.
*H04L 25/03* (2006.01)
*H04B 7/04* (2017.01)
(Continued)

(52) U.S. Cl.
CPC ..... *H04L 25/03159* (2013.01); *H04B 7/0434* (2013.01); *H04B 7/0617* (2013.01);
(Continued)

(58) Field of Classification Search
CPC .. H04B 7/0434; H04B 7/0465; H04B 7/0617; H04J 11/0063; H04L 1/0026;
(Continued)

(56) References Cited

U.S. PATENT DOCUMENTS 7,389,470 B2    6/2008  Heo et al.
8,064,532 B2 *  11/2011  Maltsev ............... H04B 7/0634
                                                                370/203
(Continued)

FOREIGN PATENT DOCUMENTS

CN    1653768 A    8/2005
CN    1956430 A    5/2007
(Continued)

OTHER PUBLICATIONS

Jing et al., "Research on Scheme of Single-carrier Frequency-Domain Equalization Systems," China (2006).
(Continued)

*Primary Examiner* — Hirdepal Singh
(74) *Attorney, Agent, or Firm* — Leydig, Voit & Mayer, Ltd.

(57) ABSTRACT

A precoding method, a precoding apparatus, a Frequency Domain Equalization (FDE) method, and an FDE apparatus are provided in the embodiments of the present invention. The precoding method includes: performing offset modulation for a transmitting signal vector; calculating a precoding matrix according to the offset-modulated transmitting signal vector and a receiver decision signal vector, where the precoding matrix is used for performing precoding for the transmitting signal vector; and performing precoding for the transmitting signal vector according to the precoding matrix. Linear precoding is performed by using the offset-modulated signal on the transmitter, and therefore, the interference caused by multiple antennas and multipath propagation is
(Continued)

reduced, the system BER is reduced, and the complexity of implementation is low.

2 Claims, 7 Drawing Sheets

Related U.S. Application Data continuation of application No. PCT/CN2010/076521, filed on Sep. 1, 2010.

(51) Int. Cl.
| | | |
|---|---|---|
| H04B 7/06 | (2006.01) | |
| H04L 1/00 | (2006.01) | |
| H04L 25/02 | (2006.01) | |
| H04L 27/02 | (2006.01) | |
| H04L 27/20 | (2006.01) | |
| H04L 27/34 | (2006.01) | |
| H04J 11/00 | (2006.01) | |
| H04L 1/06 | (2006.01) | |
| H04L 1/12 | (2006.01) | |

(52) U.S. Cl.
CPC ........ *H04J 11/0063* (2013.01); *H04L 1/0026* (2013.01); *H04L 1/0028* (2013.01); *H04L 1/0036* (2013.01); *H04L 1/0073* (2013.01); *H04L 1/0606* (2013.01); *H04L 25/0204* (2013.01); *H04L 25/03343* (2013.01); *H04L 25/03968* (2013.01); *H04L 27/02* (2013.01); *H04L 27/2082* (2013.01); *H04L 27/34* (2013.01); *H04B 7/0465* (2013.01); *H04L 2001/125* (2013.01)

(58) Field of Classification Search
CPC ... H04L 1/0028; H04L 1/0036; H04L 1/0073; H04L 1/0606; H04L 2001/125; H04L 25/0204; H04L 25/03159; H04L 25/03343; H04L 25/039
See application file for complete search history.

(56) References Cited

U.S. PATENT DOCUMENTS

| | | | |
|---|---|---|---|
| 8,165,081 B2 | 4/2012 | Papasakellariou et al. | |
| 8,199,848 B2 | 6/2012 | Kwon et al. | |
| 2003/0185310 A1 | 10/2003 | Ketchum et al. | |
| 2005/0036575 A1* | 2/2005 | Kuchi | H04L 25/03178 375/348 |
| 2005/0281323 A1* | 12/2005 | Mailaender | H04B 1/7105 375/147 |
| 2006/0023799 A1* | 2/2006 | Kang | H04L 25/022 375/260 |
| 2007/0071071 A1* | 3/2007 | Li | H04L 25/03159 375/147 |
| 2007/0076805 A1* | 4/2007 | Kalluri | H04B 7/0848 375/260 |
| 2009/0122854 A1* | 5/2009 | Zhu | H04L 25/0224 375/232 |
| 2009/0180566 A1 | 7/2009 | Kimura et al. | |
| 2011/0033004 A1 | 2/2011 | Wang et al. | |
| 2012/0230685 A1 | 9/2012 | Jung et al. | |
| 2013/0077466 A1* | 3/2013 | Takaoka | H04L 5/0041 370/210 |
| 2013/0148488 A1 | 6/2013 | Gao et al. | |
| 2013/0301751 A1 | 11/2013 | Badic et al. | |

FOREIGN PATENT DOCUMENTS

| | | |
|---|---|---|
| CN | 101204032 A | 6/2008 |
| CN | 101217304 A | 7/2008 |
| CN | 101262310 A | 9/2008 |

OTHER PUBLICATIONS

Mohammed et al., "A low-complexity precoder for large multiuser MISO systems," Vehicular Technology Conference, Institute of Electrical and Electronics Engineers, New York, New York (May 11-14, 2008).

Dabbagh et al., "Multiple antenna MMSE based downlink precoding with quantized feedback or channel mismatch," IEEE Transactions on Communications, vol. 56, Issue 11, Institute of Electrical and Electronics Engineers, New York, New York (Nov. 25, 2008).

Johma et al., "MMSE Approaches to Multiuser Spatio-Temporal Tomlinson-Harashima Precoding," ITG Workshop on Smart Antennas, Institute of Electrical and Electronics Engineers, New York, New York (Mar. 18-19, 2004).

Office Action in corresponding U.S. Appl. No. 13/329,027 (Aug. 8, 2014).

Notice of Allowance in corresponding U.S. Appl. No. 13/329,027 (Dec. 17, 2014).

\* cited by examiner

CHANNEL STATE INFORMATION TRANSMISSION METHOD, APPARATUS AND SYSTEM

CROSS-REFERENCE TO RELATED APPLICATIONS

This application is a divisional application of U.S. patent application Ser. No. 13/329,027, filed Dec. 16, 2011, which is a continuation of International Patent Application No. PCT/CN2010/076521, filed Sep. 1, 2010. The International Patent Application claims priority to Chinese Patent Application No. 200910091940.5, filed Sep. 1, 2009. The aforementioned patent applications are hereby incorporated by reference in their entireties.

FIELD OF THE INVENTION

The present invention relates to the field of communications technologies, and in particular, to a precoding method, a precoding apparatus, a Frequency Domain Equalization (FDE) method, and an FDE apparatus.

BACKGROUND OF THE INVENTION

A Multi-Input Multi-Output (MIMO) technology greatly increases the system throughput and the transmission distance without increasing bandwidth or total transmitting power, and is being used widely in the wireless communication field.

To achieve the capacity supported by the MIMO and the maximum gain of performance, a precoding method or an FDE method may be applied to suppress channel interference and distortion and improve the Bit Error Ratio (BER) performance, that is, reduce the bit error ratio.

The current precoding method is categorized into linear precoding and nonlinear precoding.

Linear precoding, such as, Zero Forcing (ZF) precoding and Minimum Mean Square Error (MMSE) precoding.

Nonlinear precoding, such as, Dirty Paper Coding (DPC) and Tomlinson-Harashima Precoding (THP).

FDE method, such as, Single-Carrier Frequency Domain Equalization (SC-FDE) applicable to Single-carrier Frequency-Division Multiple Access (SC-FDMA).

In the existing linear precoding, a linear combination of code sources of different transmitting antennas is multiplied by a precoding matrix of the signal vector. In this way, each receiving antenna can receive interference-free signals, the complexity of calculation is low, but the BER is high.

Although the existing nonlinear precoding reduces the BER, referring to Table 1, supposing that the number of transmitting antennas is N and the number of receiving antennas is N, the complexity of the nonlinear precoding is much higher than the complexity of linear precoding. Especially, the complexity of DPC is very high, as much as $e^N$, which makes the implementation rather difficult.

The existing frequency equalization method generally takes linear equalization as mainstream, and therefore, defects that calculation complexity is low while BER is high exist.

SUMMARY OF THE INVENTION

The embodiments of the present invention provide a precoding method, a precoding apparatus, an FDE method, and an FDE apparatus to reduce BER.

A precoding method provided in an embodiment of the present invention includes:

performing offset modulation for a transmitting signal vector;

calculating a precoding matrix according to the offset-modulated transmitting signal vector and a receiver decision signal vector, where the decision signal vector is a product of a receiving signal real-part vector and a multiplying factor, and the receiving signal vector is obtained by adding an additive noise vector of a channel to a product of multiplying the transmitting signal vector by both the precoding matrix and a channel matrix; and performing precoding for the transmitting signal vector according to the precoding matrix.

Corresponding to the foregoing precoding method, a precoding apparatus provided in an embodiment of the present invention includes:

an offset modulation unit, configured to perform offset modulation for a transmitting signal vector;

a precoding matrix obtaining unit, configured to calculate a precoding matrix according to the offset-modulated transmitting signal vector and a receiver decision signal vector, where the decision signal vector is a product of a receiving signal real-part vector and a multiplying factor, and the receiving signal vector is obtained by adding an additive noise vector of a channel to a product of multiplying the transmitting signal vector by both the precoding matrix and a channel matrix; and a precoding unit, configured to perform precoding for the transmitting signal vector according to the precoding matrix.

An FDE method provided in an embodiment of the present invention includes:

obtaining a receiver receiving signal frequency domain vector according to a transmitter offset-modulated transmitting signal vector, and using the receiving signal frequency domain vector and its conjugate vector as receiver input signal vectors;

obtaining an FDE matrix according to the transmitter transmitting signal vector and a receiver FDE output signal, where the FDE matrix is used for performing linear FDE for the receiver input signal vector, and an FDE output signal vector is obtained by multiplying the input signal vector by the FDE matrix; and using the FDE matrix to perform FDE for the input signal vector.

Corresponding to the foregoing FDE method, an FDE apparatus provided in an embodiment of the present invention includes:

TABLE 1

| Precoding method | MMSE | THP | DPC |
|---|---|---|---|
| Complexity | $6N^3 + 4N^2 - 2N + 3$ | $4\left[N + 2(N-1) + 3(N-2) + \ldots + \frac{N}{2}\left(\frac{N}{2}+1\right)\right] + 6N^3 + \frac{13}{2}N^2 - \frac{9}{2}N + 6$ | $O(e^N)$ | an input signal obtaining unit, configured to obtain a receiver receiving signal frequency domain vector according to a transmitter offset-modulated transmitting signal vector, and use the receiving signal frequency domain vector and its conjugate vector as receiver input signal vectors;

an FDE matrix obtaining unit, configured to obtain an FDE matrix according to the transmitter transmitting signal vector and a receiver FDE output signal, where the FDE matrix is used for performing linear FDE for the receiver input signal vector, and an FDE output signal vector is obtained by multiply the input signal vector by the FDE matrix; and an FDE unit, configured to use the FDE matrix to perform FDE for the input signal vector.

The technical solutions in the embodiments of the present invention reveals that: linear precoding is performed for the transmitter offset-modulated signal, and linear FDE is performed for the receiver signal based on the transmitter offset-modulated signal, so as to reduce the interference caused by multiple antennas and multipath propagation, reduce the system BER, and reduce the complexity of the implementation.

DETAILED DESCRIPTION OF THE EMBODIMENTS

Based on the existing MIMO technology, contradiction between BER and calculation complexity exists in the linear precoding and the nonlinear precoding. According to the embodiments of the present invention provide a precoding method and a precoding apparatus, linear precoding is performed for the transmitter offset-modulated signals to reduce interference caused by multiple antennas and multipath propagation, suppress channel interference, reduce BER, and control complexity to a large extent.

Moreover, based on the precoding method and the precoding apparatus applied on the transmitter, an FDE method and an FDE apparatus are provided in embodiments of the present invention; based on the transmitter offset-modulated signals, linear FDE is performed for the receiver signals to reduce the interference caused by multiple antennas and multipath propagation, suppress channel interference, reduce BER, and control complexity to a large extent.

Preferably, the precoding method and the precoding apparatus provided in embodiments of the present invention are applied in combination with a multi-antenna Orthogonal Frequency Division Modulation (MIMO-OFDM) mode. The MIMO-OFDM is generally applied to Long Term Evolution (LTE) downlink data transmission (from an evolved NodeB (eNB) to a user).

The FDE method and the FDE apparatus provided in embodiments of the present invention are applied to multi-antenna MIMO communication performed in a Single-carrier Frequency-Division Multiple Access (SC-FDMA) mode, and the SC-FDMA is generally applied to LTE uplink (user-to-eNB) data transmission.

A transmitting signal may be equivalent to a real signal after being offset-modulated. The offset modulation mode may be Offset Quadrature Amplitude Modulation (OQAM), Offset Quadrature Phase Shift Keying (OQPSK), Amplitude-shift Keying (ASK), Pulse Amplitude Modulation (PAM), and so on. Specifically, an expression of receiving signals may be used to reflect that the offset-modulated transmitting signal may be equivalent to the real signal:

$$r[n] = \underbrace{(\tilde{s}_I[n] + j\tilde{s}_Q[n])}_{\tilde{s}[n]} g[n] + w[n]$$

In the formula above, the receiving signal is r(n), the transmitting signal is s̃(n), the channel is g(n), and the additive noise is w(n).

The transmitting signal s̃(n) is a complex number.

$$\text{Real part } \tilde{s}_I[n] = \begin{cases} s[n], & n = 2m \ (n \text{ is even}) \\ 0, & n = 2m+1 \ (n \text{ is odd}) \end{cases}$$

$$\text{Imaginary part } \tilde{s}_Q[n] = \begin{cases} 0, & n = 2m \ (n \text{ is even}) \\ s[n], & n = 2m+1 \ (n \text{ is odd}) \end{cases}$$

As revealed above, at a certain time point, the real part of an offset-modulated signal is 0, or the imaginary part of the offset-modulated signal is 0. Because the real part or imaginary part of the offset-modulated signal carries information, the part (real part or imaginary part) of the signal that carries information is only required to be processed.

When the transmitting signal is a traditional modulated signal, the signal is a complex signal, and it is required to process the real part and the imaginary part of the transmitting signal simultaneously, which causes more interference and noise. A traditional modulated signal may be a Quadrature Amplitude Modulation (QAM) signal, Quadrature Phase Shift Keying (QPSK), ASK signal, Binary Phase Shift Keying (BPSK) signal, and so on.

Moreover, by using offset-modulated of signals, a cyclic prefix may be not required to eliminate the impact caused by inter-symbol interference. The length of the cyclic prefix is generally ⅕-¼ of the length of a data symbol. In this way, the spectrum efficiency of the system (the spectrum efficiency is generally a ratio of the amount of information transmitted along a distance to the spectrum space in use) increases by ⅕-¼ accordingly, which saves the resources significantly.

The meanings of symbols involved in the embodiments of the present invention are briefly described below:

$(\cdot)^T$—matrix transposition operation;
$(\cdot)^*$—conjugate operation;
$(\cdot)^H$—conjugate transposition of matrix;
$E[\cdot]$—mathematically expected value or mean value;
$\|\cdot\|$—Euclidean norm;
$\|\cdot\|_F$—F norm;
$Tr(\cdot)$—matrix trace;
$det(\cdot)$—matrix determinant;
$I_N$—unit matrix of a N×N size;
DFT—Discrete Fourier Transformation;
IDFT—Inverse Discrete Fourier Transformation;
FFT—Fast Fourier Transformation;
IFFT—Inverse Fast Fourier Transformation; and
FDE—Frequency Domain Equalization.

Figure 1:
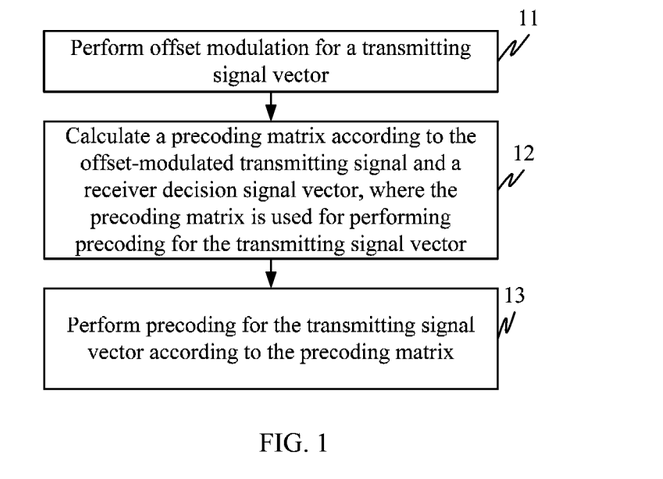
FIG. 1 is a first schematic flowchart of a precoding method according to an embodiment of the present invention.

As shown in FIG. 1, a precoding method provided in an embodiment of the present invention includes:

Step 11: Perform offset modulation for a transmitting signal vector.

After being offset-modulated, a transmitting signal on the transmitter may be equivalent to a real signal. At a certain time point, the real part of the offset-modulated signal is 0, or the imaginary part of the offset-modulated signal is 0. Because the real part or imaginary part of the offset-modulated signal carries information, the part (real part or imaginary part) of the signal that carries information is only processed subsequently.

Step 12: Calculate a precoding matrix according to the offset-modulated transmitting signal vector and a receiver decision signal vector, where the precoding matrix is used for performing precoding for the transmitting signal vector.

In step 12, the precoding matrix that is used for performing linear precoding for the transmitting signal vector may be obtained by making the mean square error between the offset-modulated transmitting signal vector and the decision signal vector to be minimum.

Preferably, a solution that the mean square error between the transmitting signal vector and the decision signal vector is minimum is an optimal solution to implementing the precoding method in this embodiment of the present invention. During actual operation, the mean square error may approach the minimum value, or approach the minimum value within an acceptable range.

A receiver receiving signal vector is obtained by adding an additive noise vector of a channel to a product of multiplying the transmitting signal vector by both the precoding matrix and the channel matrix.

The decision signal vector is a product of the real-part vector of the receiving signal and a multiplying factor.

Step 13: Perform precoding for the transmitting signal vector according to the precoding matrix.

The technical solution according to the embodiment of the present invention reveals that: The real part or imaginary part of the offset-modulated signal carries information, which avoids a trouble that the real part and the imaginary part of the transmitting signal are required to be processed simultaneously and more interference and noise are introduced if the transmitting signal is a complex signal.

If the transmitting signal is an offset-modulated signal, further, the receiver receiving signal is corrected. For example, the real part of the receiving signal is taken and multiplied by the multiplying factor to obtain a decision signal. In this way, the channel interference is suppressed, the BER is reduced, and the information included in the transmitting signal and the decision signal is made full use of.

Therefore, the precoding matrix that is used for performing precoding for the transmitting signal is obtained by making the mean square error between the transmitting signal and the decision signal to be minimum, the channel interference is eliminated, and the system BER is reduced.

Furthermore, the precoding mode performed for the transmitting signal is a linear precoding mode by making the mean square error between the transmitting signal and the decision signal to be minimum, and therefore the complexity of implementation is low.

The precoding method provided in the embodiment of the present invention is applied in combination with a multi-antenna MIMO-OFDM mode. The MIMO-OFDM is generally applied to LTE downlink (eNB-to-user) data transmission.

Optionally, in a precoding method provided in another embodiment of the present invention, before step 12, may further include:

obtaining a channel matrix H between the transmitter and the receiver, an additive noise vector n of the channel, and a noise variance $\sigma_n^2$ of the channel through channel estimation;

obtaining a pseudocovariance $\sigma_s^2$ of the transmitting signal vector s through $E[ss^T]=\sigma_s^2 I$, where I is a unit matrix, and $s^T$ is a transposition matrix of the transmitting signal vector; and obtaining the power constraint $E[\|Ps\|^2]=N_t\sigma'^2_s$ of the transmitting signal vector according to the covariance $\sigma'^2_s$ of the transmitting signal vector s and the number ($N_t$) of transmitting antennas.

Furthermore, the additive noise vector n of the channel and the noise variance $\sigma_s^2$ of the channel may be obtained by comparing the receiving signal with the decision signal; and Furthermore, the noise variance $\propto_s^2$ of the channel may be obtained through $E[nn^H]=\sigma_n^2 I$, where I is a unit matrix, and $n^H$ is a conjugate transposition matrix of the additive noise vector n.

Figure 2:
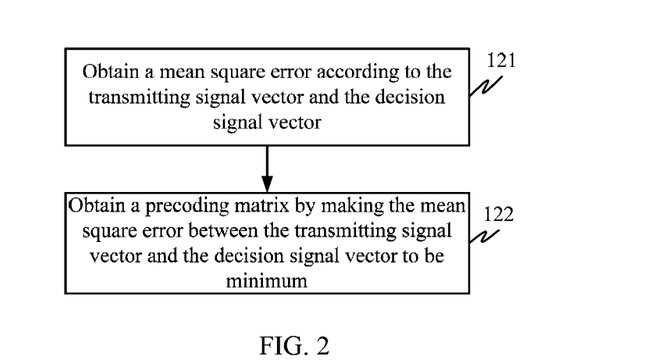
FIG. 2 is a second schematic flowchart of a precoding method according to an embodiment of the present invention.

As shown in FIG. 2, step 12 in the precoding method provided in this embodiment of the present invention may specifically include:

Step 121: According to the transmitting signal vector s and the decision signal vector $\tilde{s}=\beta^{-1}Re\{HPs+n\}$, obtain the mean square error $\epsilon=E[\|\beta^{-1}Re\{HPs+n\}-s\|^2]$, where P is a precoding matrix, $Re\{HPs+n\}$ is the real-part vector of the receiving signal, and $\beta^{-1}$ is a multiplying factor (also expressed as $$\frac{1}{\beta}).$$

Here, the real-part vector of the receiving signal is multiplied by a multiplying factor $\beta^{-1}$ to perform normalization, which reduces the impact caused by the noise and reduces the system BER.

Step 122: Obtain a precoding matrix according to the minimum value of the mean square error $\epsilon=E[\|\beta^{-1}Re\{HPs+n\}-s\|^2]$.

For example, according to the minimum value of the mean square error $\epsilon=E[\|\beta^{-1}Re\{HPs+n\}-s\|^2]$ and the power constraint $E[\|Ps\|^2]=N_t\sigma'^2_s$, obtain a precoding matrix $P^{mmse}=\beta(\tilde{P}_r^{mmse}+i\cdot\tilde{P}_i^{mmse})$ of the minimum mean square error (MMSE) algorithm.

In the formula above, $$\begin{bmatrix} \tilde{P}_r^{mmse} \\ \tilde{P}_i^{mmse} \end{bmatrix} = \begin{bmatrix} X_r + Y_r + \xi & Y_i - X_i \\ X_i + Y_i & X_r - Y_r + \xi \end{bmatrix}^{-1} \begin{bmatrix} Z_r \\ Z_i \end{bmatrix},$$

$X_r+jX_i=H^HH$, $Y_r+jY_i=H^HH^*$, $Z_r+jZ_i=2H^H$, $\xi=\sigma_n^2\div\sigma_s^2$, and $$\beta = \sqrt{\frac{N_t\sigma_s^2}{Tr(\tilde{P}^{mmse}\tilde{P}^{mmse,H})}}.$$

Alternatively, step 122: Obtain a precoding matrix according to the minimum value of the mean square error $\epsilon=E[\|\beta^{-1}Re\{HPs+n\}-s\|^2]$.

For example, obtain a precoding matrix $P^{zf}=\beta(\tilde{P}_r^{zf}+i\cdot\tilde{P}_i^{zf})$ of the ZF algorithm according to the minimum value of the mean square error $\epsilon=E[\|\beta^{-1}Re\{HPs+n\}-s\|^2]$.

In the formula above, $$\begin{bmatrix} \tilde{P}_r^{zf} \\ \tilde{P}_i^{zf} \end{bmatrix} = \begin{bmatrix} X_r + Y_r & Y_i - X_i \\ X_i + Y_i & X_r - Y_r \end{bmatrix}^{-1} \begin{bmatrix} Z_r \\ Z_i \end{bmatrix},$$

$X_r+jX_i=H^HH$, $Y_r+jY_i=H^HH^*$, $Z_r+jZ_i=2H^H$, and $$\beta = \sqrt{\frac{N_t\sigma_s^2}{Tr(\tilde{P}^{zf}\tilde{P}^{zf,H})}}.$$

Further, step 13 in a precoding method provided in another embodiment of the present invention may include:

multiplying the precoding matrix P by the transmitter transmitting signal vector s to obtain a precoded signal vector;

multiplying the precoded signal vector by the channel matrix H, and adding the additive noise vector n of the channel to obtain the receiver receiving signal Y=HPs+n.

Figure 3:
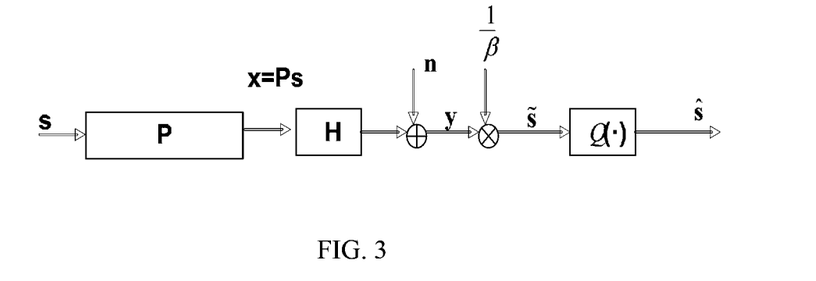
FIG. 3 is a schematic diagram of an application scenario of a precoding method according to an embodiment of the present invention.

FIG. 3 is a schematic diagram of an application scenario of a precoding method according to an embodiment of the present invention. Referring to FIG. 3, Y=HPs+n=$H_E$s+n, where Y is a receiver receiving signal, P is a precoding matrix (such as $P^{mmse}$ or $P^{zf}$), and $H_E$ is a precoded equivalent channel matrix.

The equivalent channel matrix $H_E$ may overcome the estimation deviation generated by factors such as abrupt interference, and reduces the system Bit error rate (BER).

Moreover, it can be seen that the precoding method provided in this embodiment of the present invention belongs to a linear precoding method, and is easy to implement.

Referring to FIG. 3, step 12 in a precoding method provided in another embodiment of the present invention:

judging whether the modulation mode of the transmitting signal is an offset modulation when the modulation mode of the transmitting signal is unknown.

Judging whether the transmitting signal is the offset-modulated signal is specifically: calculating $E[ss^T]$ according to the transmitting signal vector s, and judging whether the condition $E[ss^T]=\sigma_s^2 I\neq 0$ is fulfilled:

If $E[ss^T]\neq 0$, the transmitting signal is already an offset-modulated signal; or If $E[ss^T]=0$, the transmitting signal is not an offset-modulated signal, and perform offset modulation for the transmitting signal.

Preferably, if the modulation mode of the transmitting signal is offset modulation, the procedure proceeds to step 12, and the precoding method provided in the embodiment of the present invention is used for performing precoding for the transmitting signal. If the modulation mode of the transmitting signal is not offset modulation, the transmitting signal may be precoded directly according to the traditional ZF or MMSE linear precoding method, or may be precoded according to the precoding method provided in the embodiment of the present invention.

Figure 4:
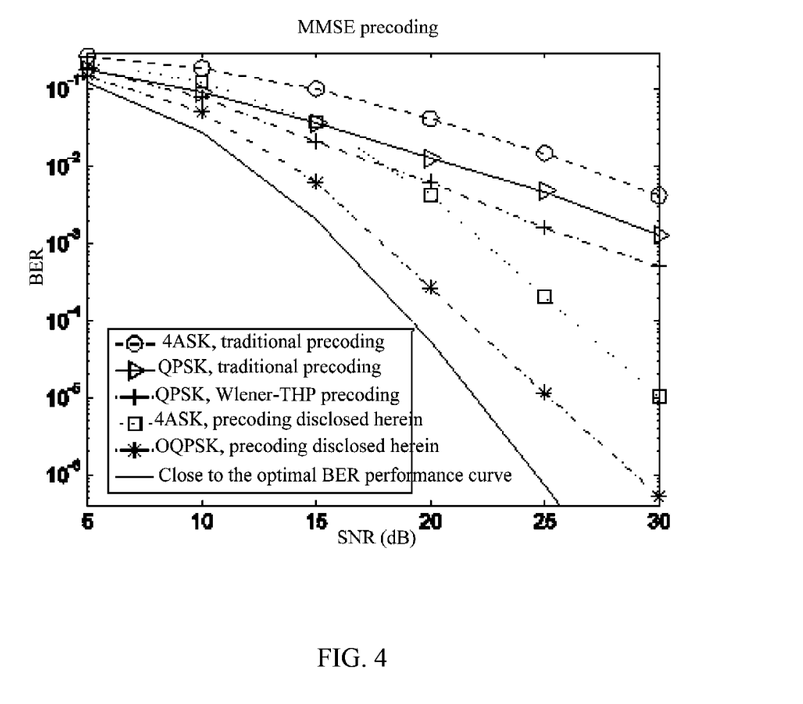
FIG. 4 is a schematic diagram of BER of a precoding method according to an embodiment of the present invention.

Referring to FIG. 4, the BER of the precoding method provided in the embodiment of the present invention and the BER of the traditional precoding method are obtained through emulation, and the BER performance gain obtained by the precoding method provided in the embodiment of the present invention can be revealed.

The emulation conditions are as follows: On the LTE downlink channel, $N_t=N_r=4$. That is, there are 4 transmitting antenna $N_t$ on the eNB and 4 receiving antenna $N_r$ of the user on the receiver, and the transmitting power is $N_t\sigma_s^2=4$. Suppose that the channel is an independent common-distribution Rayleigh fading channel, and the channel matrix is normalized as $E[\|H\|_F^2]=1$.

A 4ASK signal, a QPSK signal, or OQPSK signal (all signals have the same spectrum efficiency) are respectively used as the transmitting signal. The traditional MMSE precoding is performed for the 4ASK signal or the QPSK signal, the Wiener-THP precoding (Wiener filter combined with THP) is performed for the QPSK signal, and the MMSE precoding provided in the embodiment of the present invention is performed for the 4ASK signal or OQPSK signal.

The MIMO emulation results are average Signal-to-Noise Ratio (SNR) and average BER of at least 50,000 channels.

As shown in FIG. 4, the X axis is SNR (measured in dB), the Y axis is BER. In FIG. 4, the BER curve of DPC precoding is used as the close to the optimal BER performance curve.

Therefore, the BER performance of the precoding method in this embodiment of the present invention is better than the BER performance of the MMSE precoding method and the BER performance of the THP precoding, and the BER performance curve of the precoding method in this embodiment of the present invention extremely approaches the close to the optimal BER performance curve of the DPC. Moreover, with increase of the SNR, the BER of the precoding method in this embodiment of the present invention decreases.

From the above description, it can be seen that, the precoding method in this embodiment of the present invention may improve the BER performance when the transmitting signal is offset-modulated, such as the BER performance curve of the OQPSK signal shown in FIG. 4, and improves the BER performance when the transmitting signal is non-offset-modulated, such as the BER performance curve of the 4ASK signal shown in FIG. 4.

Referring to Table 1 again, supposing that the number of transmitting antennas ($N_t$) is N and the number of receiving antennas ($N_r$) is N, the complexity of the precoding code in this embodiment of the present invention is $20N^3+5N^2-3N+3$ shown in Table 2. The gain about the complexity of the precoding method in this embodiment of the present invention is revealed, the complexity of the precoding method in this embodiment is low, and is close to the complexity of the traditional MMSE precoding.

according to the covariance $\sigma_s'^2$ of the transmitting signal vector s and the number of transmitting antennas $N_t$.

The parameter obtaining unit 54 is further configured to obtain $\sigma_n^2$ by calculating $E[nn^H]=\sigma_n^2 I$, where I is a unit matrix, and $n^H$ is a conjugate transposition matrix of the additive noise vector n.

The channel matrix H, the additive noise vector n of the channel, and the noise variance $\sigma_n^s$ of the channel can be obtained and calculated according to the prior art, which will

TABLE 2

| Precoding method | MMSE | THP | DPC | Precoding method discosed herein |
|---|---|---|---|---|
| Complexity | $6N^3 + 4N^2 - 2N + 3$ | $4\left[N + 2(N-1) + 3(N-2) + \ldots + \frac{N}{2}\left(\frac{N}{2}+1\right)\right] + 6N^3 + \frac{13}{2}N^2 - \frac{9}{2}N + 6$ | $O(e^N)$ | $20N^3 + 5N^2 - 3N + 3$ |

In conclusion, as shown in FIG. 4 and Table 2, the precoding method in this embodiment of the present invention reduces the system BER, and implements low complexity.

Figure 5:
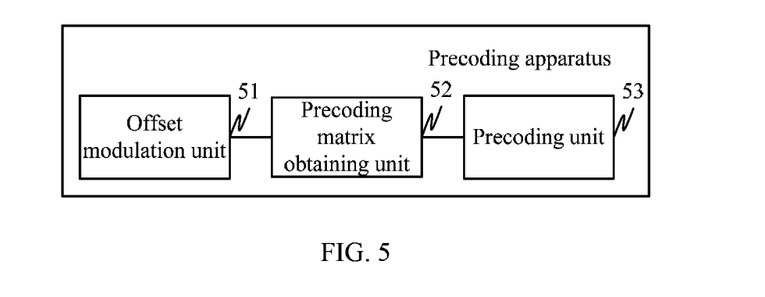
FIG. 5 is a first composition diagram of a precoding apparatus according to an embodiment of the present invention.

As shown in FIG. 5, corresponding to the precoding method in Embodiment 1, a precoding apparatus is provided in an embodiment of the present invention. The precoding apparatus includes:

an offset modulation unit 51, configured to perform offset modulation for a transmitting signal vector;

a precoding matrix obtaining unit 52, configured to calculate a precoding matrix according to the offset-modulated transmitting signal vector and a receiver decision signal vector, where the precoding matrix is used for performing precoding for the transmitting signal vector, the decision signal vector is a product of a receiving signal real-part vector and a multiplying factor, and the receiving signal vector is obtained by adding an additive noise vector of a channel to a product of multiplying the transmitting signal vector by both the precoding matrix and a channel matrix; and a precoding unit 53, configured to perform precoding for the transmitting signal vector according to the precoding matrix.

The precoding matrix obtaining unit 52 is specifically configured to obtain the precoding matrix by making the mean square error between the transmitting signal vector and the decision signal vector to be minimum, where the precoding matrix is used for performing linear precoding for the transmitting signal vector.

Preferably, a solution that the mean square error between the transmitting signal vector and the decision signal vector is minimum is an optimal solution to implementing the precoding method in this embodiment of the present invention. During actual operation, the mean square error may approach the minimum value, or approach the minimum value within an acceptable range.

Figure 6:
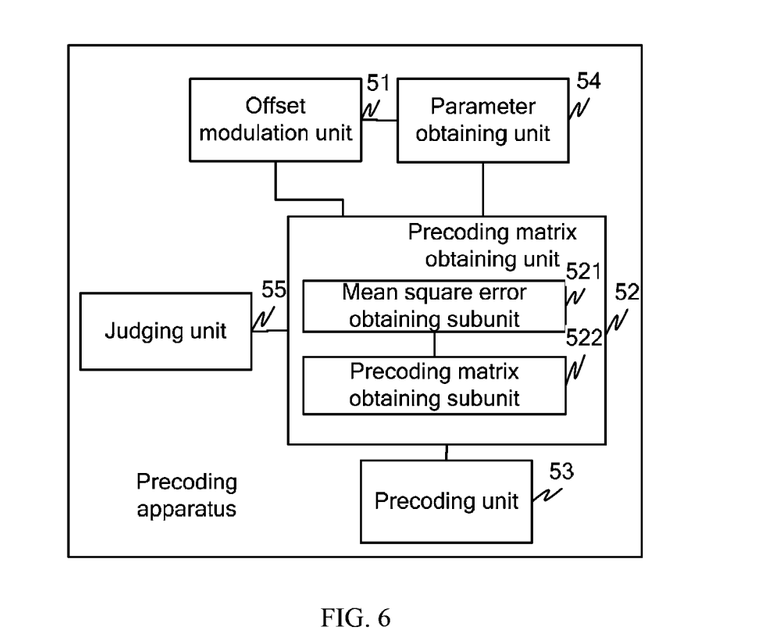
FIG. 6 is a second composition diagram of a precoding apparatus according to an embodiment of the present invention.

Optionally, as shown in FIG. 6, the precoding apparatus provided in this embodiment of the present invention may further include:

a parameter obtaining unit 54, configured to: obtain a channel matrix H between the transmitter and the receiver, an additive noise vector n of the channel, and a noise variance $\sigma_s^2$ of the channel through channel estimation; obtain the pseudocovariance $\sigma_s^2$ of the transmitting signal vector s by calculating $E[ss^T]=\sigma_s^2 I$, where I is a unit matrix, and $s^T$ is a transposition matrix of the transmitting signal vector; and obtain the power constraint $E[\|Ps\|^2]=N_t\sigma_s'^2$ not detailed herein. The covariance $\sigma_s'^2$ of the transmitting signal vector and the number of transmitting antennas $N_t$ can be obtained and calculated according to the prior art, which will not detailed herein.

As shown in FIG. 6, specifically, the precoding matrix obtaining unit 52 may include:

A mean square error obtaining subunit 521, which is configured to: according to the transmitting signal vector s and the decision signal vector $\tilde{s}=\beta^{-1}Re\{HPs+n\}$, obtain a mean square error $\epsilon=E[\|\beta^{-1}Re\{HPs+n\}-s\|^2]$, where P is a precoding matrix, Re$\{HPs+n\}$ is a real-part vector of the receiving signal, and $\beta^{-1}$ is a multiplying factor.

The decision signal vector is obtained by multiplying the real-part vector of the receiving signal by a multiplying factor; the receiving signal vector is obtained by adding an additive noise vector of a channel to a product of multiplying the transmitting signal vector by both the precoding matrix and the channel matrix.

A precoding matrix obtaining subunit 522, which is configured to obtain the precoding matrix $P^{mmse}=\beta(\tilde{P}_r^{mmse}+i\cdot\tilde{P}_i^{mmse})$ of the MMSE algorithm according to the mean square error $\epsilon=E[\|\beta^{-1}Re\{HPs+n\}-s\|^2]$ and the power constraint $E[\|Ps\|^2]=N_t\sigma_s'^2$.

In the formula above, $$\begin{bmatrix} \tilde{P}_r^{mmse} \\ \tilde{P}_i^{mmse} \end{bmatrix} = \begin{bmatrix} X_r+Y_r+\xi & Y_i-X_i \\ X_i+Y_i & X_r-Y_r+\xi \end{bmatrix}^{-1} \begin{bmatrix} Z_r \\ Z_i \end{bmatrix},$$

$X_r+jX_i=H^H H$, $Y_r+jY_i=H^H H^*$, $Z_r+jZ_i=2H^H$, $\xi=\sigma_n^2 \div \sigma_s^2$, and $$\beta = \sqrt{\frac{N_t \sigma_s^2}{Tr(\tilde{P}^{mmse}\tilde{P}^{mmse,H})}}.$$

Alternatively, the precoding matrix obtaining subunit 522, which is configured to obtain the precoding matrix $P^{zf}=\beta(\tilde{P}_r^{zf}+i\cdot\tilde{P}_i^{zf})$ of the ZF algorithm according to the mean square error $\epsilon=E[\|\beta^{-1}Re\{HPs+n\}-s\|^2]$.

In the formula above, $$\begin{bmatrix} \tilde{P}_r^{zf} \\ \tilde{P}_i^{zf} \end{bmatrix} = \begin{bmatrix} X_r+Y_r & Y_i-X_i \\ X_i+Y_i & X_r-Y_r \end{bmatrix}^{-1} \begin{bmatrix} Z_r \\ Z_i \end{bmatrix},$$

$X_r+jX_i=H^HH$, $Y_r+jY_i=H^HH^*$, $Z_r+jZ_i=2H^H$, and $$\beta = \sqrt{\frac{N_t\sigma_s^2}{Tr(\tilde{P}^{zf}\tilde{P}^{zf,H})}}.$$

The precoding unit 53 is specifically configured to obtain a precoded signal vector by multiplying the precoding matrix P by the transmitter transmitting signal vector s, and obtain the receiver receiving signal Y=HPs+n by adding an additive noise vector n of a channel to a product of the precoded signal vector and the channel matrix H.

Y=HPs+n=$H_E$s+n, where Y is the receiver receiving signal, P is a precoding matrix (such as $P^{mmse}$ or $P^{zf}$), and $H_E$ is a precoded equivalent channel matrix.

Referring to FIG. 6, when the modulation mode of the transmitting signal is unknown, a precoding apparatus is provided in another embodiment of the present invention, and may further include a judging unit 55, which is configured to judge whether the modulation mode of the transmitting signal is offset modulation.

Judging, by the judging unit 55, whether the transmitting signal is an offset-modulated signal specifically is: calculating $E[ss^T]$ according to the transmitting signal vector s, and judging whether the condition $E[ss^T]=\sigma_s^2I\neq 0$ is fulfilled:

If $E[ss^T]\neq 0$, the transmitting signal is an offset-modulated signal; or

If $E[ss^T]=0$, the transmitting signal is a non-offset-modulated signal, and offset modulation is performed for the transmitting signal.

The technical solution according to the embodiment of the present invention reveals that: Linear precoding is performed for the transmitter offset-modulated signal, so as to reduce the interference caused by multiple antennas and multipath propagation, suppress the channel interference, and reduce the BER.

Figure 7:
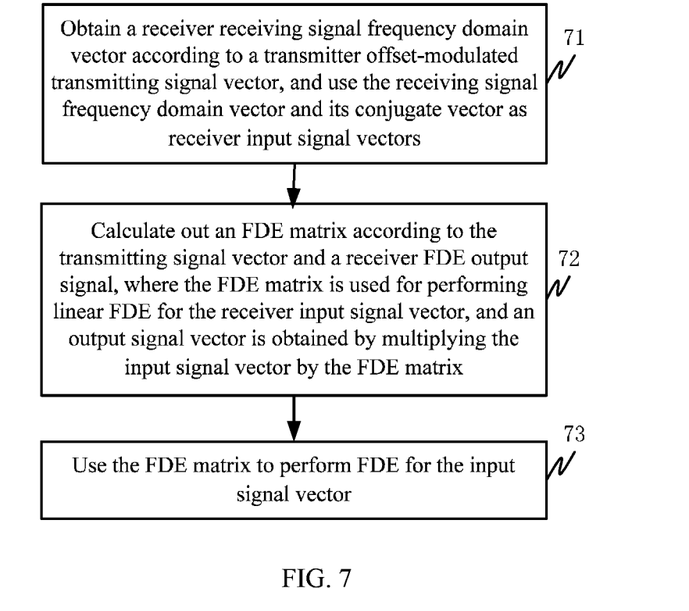
FIG. 7 is a first schematic flowchart of an FDE method according to an embodiment of the present invention.

As shown in FIG. 7, corresponding to the precoding embodiments, an FDE method is provided in this embodiment of the present invention. The PDE method includes:

Step 71: Obtain a receiver receiving signal frequency domain vector according to a transmitter offset-modulated transmitting signal vector, and use the receiving signal frequency domain vector and its conjugate vector as receiver input signal vectors;

Step 72: Calculate out an FDE matrix according to the transmitter transmitting signal vector and a receiver FDE output signal, where the FDE matrix is used for performing linear FDE for the receiver input signal vector, and an FDE output signal vector is obtained by multiply the input signal vector by the FDE matrix.

Step 73: Use the FDE matrix to perform FDE for the input signal vector.

The step 72 is specifically: make the mean square error between the transmitter transmitting signal vector and the receiver output signal vector to be minimum, and obtain an FDE matrix that is used for performing linear FDE for the receiver input signal vector.

Preferably, a solution that the mean square error between the transmitter transmitting signal vector and the receiver output signal vector is minimum is an optimal solution to implementing the FDE method in this embodiment of the present invention. During actual operation, the mean square error may approach the minimum value, or approach the minimum value within an acceptable range.

The foregoing technical solution in the embodiment of the present invention reveals that: The real part or imaginary part of the offset-modulated signal carries information, which avoids a trouble that the real part and the imaginary part of the transmitting signal are processed simultaneously and more interference and noise are introduced when the transmitting signal is a complex signal.

If the transmitting signal is an offset-modulated signal, further, the receiver receiving signal is corrected, such as, a conjugate matrix of the receiving signal frequency domain vector is obtained, so as to make full use of the information included in the transmitting signal and the decision signal. If the receiving signal is a time domain signal, Fourier transformation is performed for the receiving signal to obtain a receiving signal frequency domain vector and a conjugate matrix of the receiving signal frequency domain vector, and the information included in the transmitting signal and the decision signal is made full use of to perform the FDE.

Therefore, the receiving signal frequency domain vector and its conjugate matrix are used as input signals, an FDE matrix that is used for performing FDE for input signals is obtained by obtaining the MMSE of the input signals and the output signals, the channel interference is eliminated, and the system BER is reduced.

Moreover, the FDE method provided in this embodiment of the present invention belongs to a linear FDE method, and the complexity of implementation is low.

The FDE method disclosed herein is applied to multi-antenna MIMO communication performed in an SC-FDMA mode, and the SC-FDMA is generally applied to uplink (user-to-eNB) data transmission.

In step 71 according to the FDE method provided in this embodiment of the present invention, the transmitter transmitting signal vector is s, the receiving signal frequency domain vector on the receiver is r, the conjugate vector of r is r*, and $$\begin{bmatrix} r \\ r^* \end{bmatrix}$$

is used as a signal vector processed on the receiver $$y = \begin{bmatrix} r \\ r^* \end{bmatrix}.$$

Moreover, the offset modulation mode may be OQAM, OQPSK, ASK, PAM, and so on.

Optionally, the FDE method provided in this embodiment of the present invention, before step 71, may further include:

obtaining a channel matrix H between the transmitter and the receiver through channel estimation.

Figure 8:
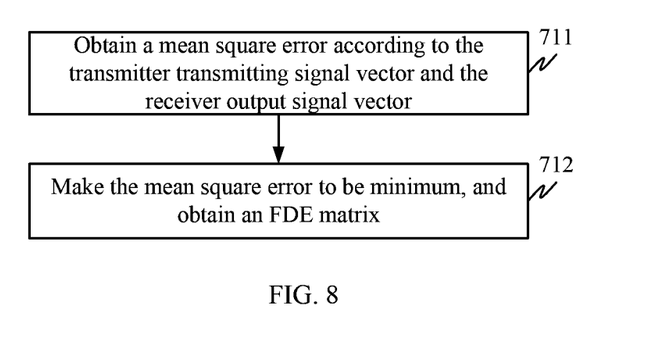
FIG. 8 is a second schematic flowchart of an FDE method according to an embodiment of the present invention.

As shown in FIG. 8, further, step 71 in the FDE method in another embodiment of the present invention may specifically include:

Step 711: According to the transmitter transmitting signal vector s and the receiver output signal vector $$z = \Omega \begin{bmatrix} r \\ r^* \end{bmatrix},$$

make the mean square error $$\varepsilon = E\left[\left\|\Omega\begin{bmatrix}r\\r^*\end{bmatrix}-s\right\|^2\right]$$

to be minimum, where $\Omega$ is an FDE matrix, r is a frequency domain vector matrix of the receiving signal, r* is a conjugate matrix of r, and the receiver input signal vector is $$y = \begin{bmatrix}r\\r^*\end{bmatrix}.$$

Step 712: Obtain an SC-FDMA matrix $$\Omega = \begin{bmatrix} HPP^H H^H + N_0 I & HPD_F D_F^T P^T H^T \\ H^* P^* D_F^* D_F^H P^H H^H & H^* P^* P^T H^T + N_0 I \end{bmatrix}^{-1} \begin{bmatrix} HP \\ H^* P(D_F D_F^T)^* \end{bmatrix}$$

according to the mean square error $$\varepsilon = E\left[\left\|\Omega\begin{bmatrix}r\\r^*\end{bmatrix}-s\right\|^2\right].$$

In the formula above, P is a transmitting power matrix of all transmitting signals on the transmitter, and is a diagonal matrix. The elements of P correspond to different subcarriers and transmitting power of different antennas. Its submatrix is $P_i = \text{diag}\{\sqrt{p_{i,1}}, \sqrt{p_{i,2}}, \ldots, \sqrt{p_{i,N}}\}$, $D_F$ is a Fourier transformation matrix of all receiving signals on the receiver, and $N_0 I$ is a covariance matrix of an additive white Gaussian noise of the channel.

Specifically, step 73 in an FDE method in this embodiment of the present invention is specifically:

multiplying the FDE matrix $\Omega$ by the receiver input signal vector $$y = \begin{bmatrix}r\\r^*\end{bmatrix}$$

to obtain a receiver output signal vector.

The FDE method provided in this embodiment of the present invention may also applicable to FDE of non offset-modulated signals to improve BER performance.

The FDE method provided in this embodiment of the present invention belongs to a linear FDE method, and complexity of implementation is low.

Figure 9:
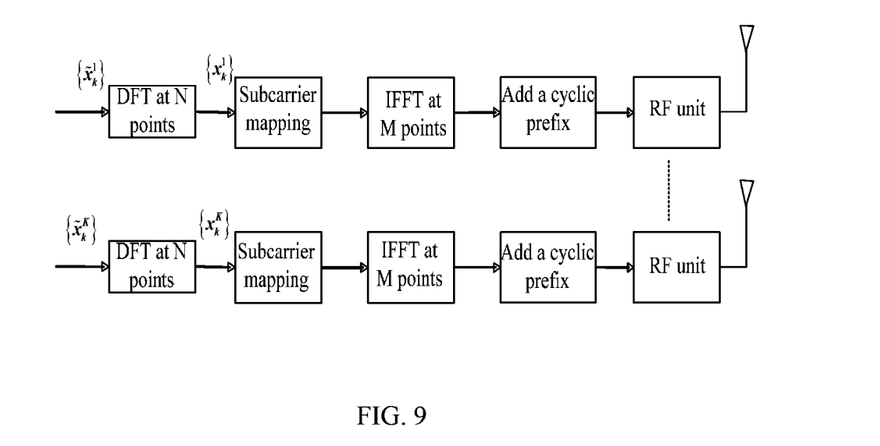
FIG. 9 is a schematic diagram of a transmitter application scenario of an FDE method according to an embodiment of the present invention.
Figure 10:
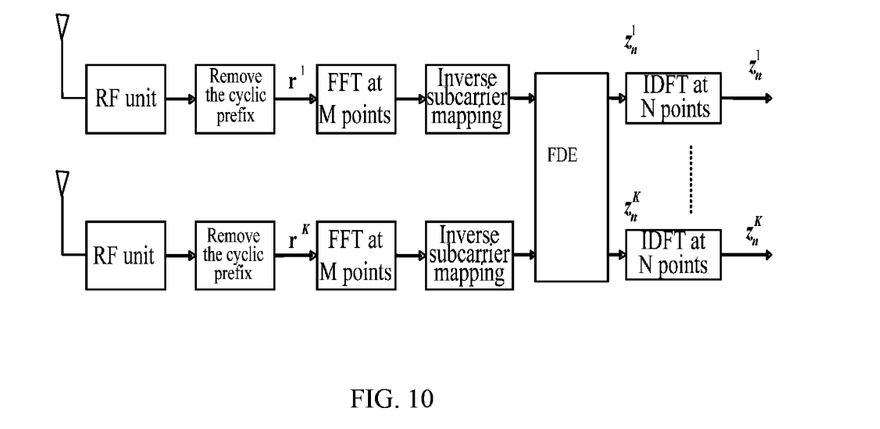
FIG. 10 is a schematic diagram of a receiver application scenario of an FDE method according to an embodiment of the present invention.

Referring to FIG. 9 and FIG. 10, schematic diagrams of a transmitter and receiver application scenarios of an FDE method according to an embodiment of the present invention are provided by taking an example that multi-antenna MIMO communication is performed in an SC-FDMA mode for describing the an FDE method in an embodiment of the present invention.

As shown in FIG. 9 and FIG. 10, x represents a frequency domain symbol, $\tilde{x}$ represents a time domain symbol, x includes $\{x_k^1\}$ to $\{x_k^K\}$, and $\tilde{x}$ includes $\{\tilde{x}_k^1\}$ to $\{\tilde{x}_k^K\}$; z represents a frequency domain symbol, $\tilde{z}$ represents a time domain symbol, z includes $\{z_n^1\}$ to $\{z_n^k\}$, and $\tilde{z}$ includes $\{\tilde{z}_n^1\}$ to $\{\tilde{z}_n^k\}$; $\tilde{r}$ represents a time domain symbol, and $\tilde{r}$ includes $\tilde{r}^{(1)}$ to $\tilde{r}^{(k)}$.

$D_{F_M} = I_K \otimes F_M$ is defined as a Fast Fourier Transformation (FFT) matrix of all users on the receiver, where $I_K$ is a unit matrix whose size is K×K, $F_M$ is an FFT matrix whose size is M×M, and $\otimes$ is a Kronecker product. In the same manner, the Inverse Fast Fourier Transformation (IFFT) matrix of all users on the receiver is $D_{F_M}^{-1} = I_K \otimes F_M^{-1}$. $F_n$ is defined as a subcarrier mapping matrix (whose size is M×N), and its inverse subcarrier mapping matrix is $F_n^{-1}$ (whose size is N×M). The signal free of the cyclic prefix on the receiver may be expressed as $\tilde{r} = \tilde{H} D_{F_M}^{-1}(I_K \otimes F_n) D_{F_N} \tilde{x} + \tilde{w}$, where $\tilde{H}$ is a time domain matrix of the channel, $\tilde{w}$ is a time-domain additive Gaussian white noise of the channel, and $D_{F_N}$ is a Discrete Fourier Transformation (DFT) matrix.

Specifically, as shown in FIG. 9, the transmitter in the FDE method according to this embodiment of the present invention is:

The number of transmitting antennas $N_t$ on the transmitter is K, and the transmitting signal is an offset-modulated signal; $\{\tilde{x}_k^1\}$ to $\{\tilde{x}_k^K\}$ in undergo DFT at N points respectively to obtain frequency domain symbols $\{x_k^1\}$ to $\{x_k^K\}$; frequency domain symbols $\{x_k^1\}$ to $\{x_k K\}$ undergo subcarrier mapping and IFFT; afterward, the frequency domain symbols to which a cyclic prefix is added are sent by a Radio Frequency (RF) unit.

It should be noted that the purpose of adding the cyclic prefix is to reduce impact caused by multipath (namely, inter-symbol interference). The cyclic prefix may not be added, which is not mandatory.

As shown in FIG. 10, the receiver in the FDE method according to this embodiment of the present invention:

The number of receiving antennas $N_r$ is k, the RF unit receives the time domain symbols sent by the transmitter, and removes the cyclic prefix from the time domain symbols to obtain time domain symbols $\tilde{r}^{(1)}$ to $\tilde{r}^{(k)}$. $\tilde{r}^{(1)}$ to $\tilde{r}^{(k)}$ undergo FFT to obtain frequency domain symbols. The frequency domain symbols undergo inverse subcarrier mapping and then undergo FDE to obtain $\{z_n^1\}$ to $\{z_n^k\}$. Finally, $\{z_n^1\}$ to $\{z_n^k\}$ undergo IDFT to output time domain symbols $\{\tilde{z}_n^k\}$ to $\{\tilde{z}_n^k\}$.

The FDE method provided in this embodiment of the present invention is mainly to perform Fourier transformation (such as DFT or FFT) for $\tilde{r}$ to obtain r by using an FDE matrix $\Omega$, and perform FDE for r and r*, namely, to multiply the FDE matrix $\Omega$ by a matrix composed of r and r*, where r derives from Fourier transformation of $\tilde{r}$, and r* is a conjugate matrix of r.

The receiver input signal vector is $$y = \begin{bmatrix}r\\r^*\end{bmatrix},$$

the FDE matrix is $$\Omega = \begin{bmatrix}\zeta\\\eta\end{bmatrix},$$

and r is linearly combined with r*. The output signal of the receiver FDE may be expressed as:

$$z = \zeta r + \eta r^* = \Omega^H y.$$

The BER of the FDE method in the embodiment of the present invention and the BER of the traditional FDE method are obtained through emulation in the following, which can reveal that the BER performance gain obtained by the FDE method in the embodiment of the present invention.

The emulation conditions are: On the LTE uplink channel, two users exist on the transmitter, and each user has 2 antennas; and 4 antennas exist on the receiver eNB; the channel is a 6-path Rayleigh fading channel; the number of FFT sampling points is 256, the length of the cyclic prefix is 8 (bytes), and the length of the data block is 12 (bytes).

Figure 11:
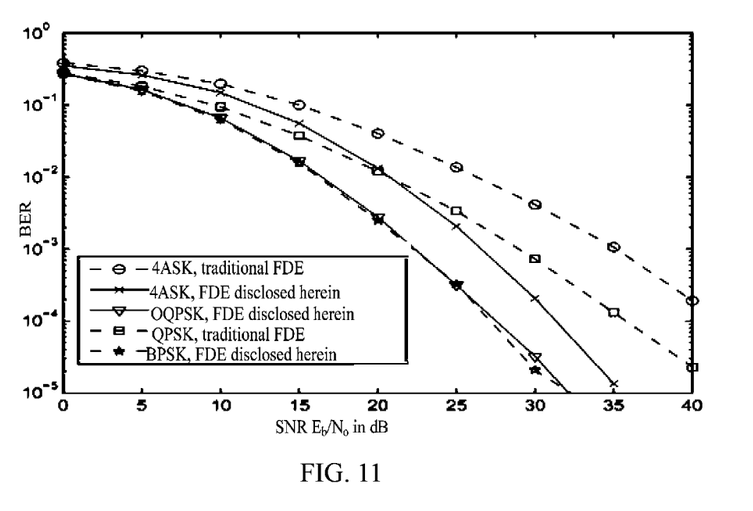
FIG. 11 is a schematic diagram of BER of an FDE method according to an embodiment of the present invention.

As shown in FIG. 11, FDE is performed for a 4ASK signal or a QPSK signal by using a traditional FDE method, and FDE is performed for the 4ASK signal or BPSK signal or OQPSK signal by using an FDE method in the embodiment of the present invention. A chart is obtained, in which the X axis is Eb/No (normalized SNR, measured in dB), and the Y axis is BER.

As a result, a BER performance curve that is obtained after the FDE according to the embodiment of the present invention is performed for the BPSK signal or OQPSK signal is optimal, and the second best BER performance curve is the BER performance curve of the 4ASK signal. Moreover, with increase of the SNR, the BER of the FDE method in this embodiment of the present invention decreases.

Besides, the FDE method in this embodiment of the present invention may improve the BER performance when the transmitting signal is an offset-modulated signal, such as the BER performance curve of the OQPSK signal shown in FIG. 11, and the FDE method in this embodiment of the present invention may improve the BER performance of the non-offset-modulated signal, such as the BER performance curve of the 4ASK signal or BPSK signal shown in FIG. 11.

Supposing that both the number of transmitting antennas $N_t$ and the number of receiving antennas $N_r$ are K, and DFT and IDFT are performed at N points of the transmitter and the receiver, the complexity of the FDE method in the embodiment of the present invention is compared with the complexity of the traditional MMSE FDE method in the following table:

TABLE 3

| Complexity | × | ÷ | + | − |
|---|---|---|---|---|
| Traditional MMSE method | $4K^3N^3 + K^2N^2 + 2K\,N$ | $2K^2N^2$ | $2K^2N^2 - 2K\,N$ | $2K^3N^3$ |
| Method disclosed herein | $23K^3N^3 + K\,N^3 + 3K^2N^2 + 3K\,N$ | $8K^2N^2$ | $8K^2N^2 + 2K\,N^2 - 7K\,N$ | $16K^3N^3$ |

As a result, the complexity of the FDE method in the embodiment of the present invention is low, and is close to the complexity of the traditional MMSE FDE method.

In conclusion, as shown in FIG. 11 and Table 3, the FDE method in this embodiment of the present invention reduces the system BER, and complexity of implementation is low.

Figure 12:
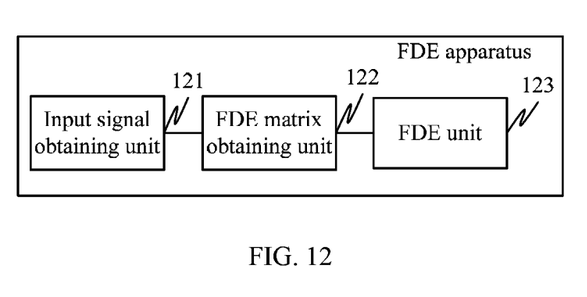
FIG. 12 is a first composition diagram of an FDE apparatus according to an embodiment of the present invention.

As shown in FIG. 12, corresponding to the FDE method in Embodiment 3, an FDE apparatus is provided in the embodiment of the present invention. The FDE apparatus includes:

an input signal obtaining unit 121, configured to obtain a receiver receiving signal frequency domain vector according to a transmitter offset-modulated transmitting signal vector, and use the receiving signal frequency domain vector and its conjugate vector as receiver input signal vectors;

an FDE matrix obtaining unit 122, configured to calculate out an FDE matrix according to the transmitter transmitting signal vector and a receiver FDE output signal, where the FDE matrix is used for performing linear FDE for the receiver input signal vector, and an FDE output signal vector is obtained by multiplied the input signal vector by the FDE matrix; and an FDE unit 123, configured to use the FDE matrix to perform FDE for the input signal vector.

The FDE matrix obtaining unit is specifically to: make the mean square error between the transmitter transmitting signal vector and the receiver output signal vector to be minimum, and obtain an FDE matrix for performing linear FDE for the receiver input signal vector.

Preferably, a solution that the mean square error between the transmitter transmitting signal vector and the receiver output signal vector is minimum is an optimal solution to implementing the FDE method in this embodiment of the present invention. During actual operation, the mean square error may approach the minimum value, or approach the minimum value to an acceptable extent.

Figure 13:
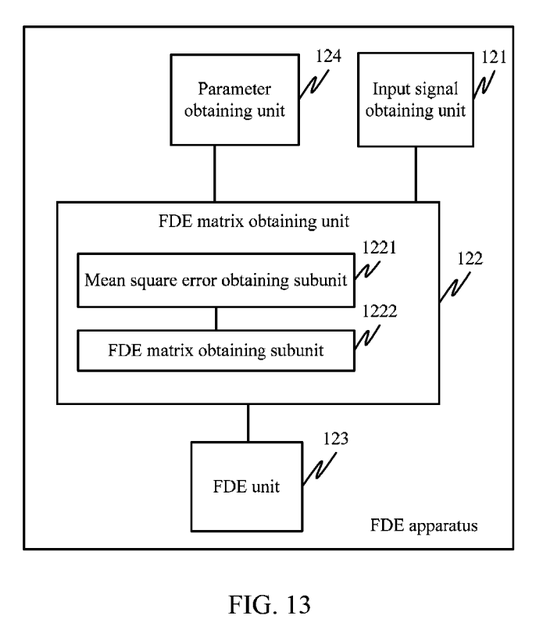
FIG. 13 is a second composition diagram of an FDE apparatus according to an embodiment of the present invention.

Optionally, as shown in FIG. 13, the FDE apparatus provided in this embodiment of the present invention may further include:

a parameter obtaining unit 124, configured to obtain a channel matrix H between the transmitter and the receiver through channel estimation.

Specifically, the FDE matrix obtaining unit 122 in the FDE apparatus provided in this embodiment of the present invention may include:

a mean square error obtaining subunit 1221, configured to: according to the transmitter transmitting signal vector s and the receiver output signal vector $$z = \Omega \begin{bmatrix} r \\ r^* \end{bmatrix},$$

obtain the mean square error $$\varepsilon = E\left[\left\| \Omega \begin{bmatrix} r \\ r^* \end{bmatrix} - s \right\|^2\right],$$

where Ω is an FDE matrix, r is a frequency domain vector matrix of the receiving signal, r* is a conjugate matrix of r, and the receiver input signal vector is $$y = \begin{bmatrix} r \\ r^* \end{bmatrix};$$

and an FDE matrix obtaining subunit 1222, configured to obtain an SC-FDMA matrix $$\Omega = \begin{bmatrix} HPP^H H^H + N_0 I & HPD_F D_F^T P^T H^T \\ H^* P^* D_F^* D_F^H P^H H^H & H^* P^* P^T H^T + N_0 I \end{bmatrix}^{-1} \begin{bmatrix} HP \\ H^* P(D_F D_F^T)^* \end{bmatrix}$$

according to the mean square error $$\varepsilon = E\left[\left\|\Omega\begin{bmatrix} r \\ r^* \end{bmatrix} - s\right\|^2\right].$$

In the formula above, P is a transmitting power matrix of all transmitting signals on the transmitter, $D_F$ is a Fourier transformation matrix of all receiving signals on the receiving side, and $N_0 I$ is a covariance matrix of an additive white Gaussian noise of the channel.

The FDE unit 123 is further configured to multiply the FDE matrix $\Omega$ by the receiver input signal vector $$y = \begin{bmatrix} r \\ r^* \end{bmatrix}$$

to obtain a receiver output signal vector.

The foregoing technical solution in the embodiment of the present invention reveals that: Linear FDE is performed for the receiver signal, so as to reduce the interference caused by multiple antennas and multipath propagation, suppress the channel interference, and reduce the BER. Moreover, the complexity of implementing linear FDE is low.

Persons of ordinary skill in the art should understand that all or part of the steps of the method provided in the embodiments above may be implemented by a program instructing relevant hardware. The program may be stored in computer readable storage media. When the program runs, the program executes the steps of the method specified in any embodiment above. The storage media may be a magnetic disk, CD-ROM, Read-Only Memory (ROM), or Random Access Memory (RAM).

What is claimed is:

1. A Frequency Domain Equalization (FDE) method, comprising:
    obtaining, at a receiver, a receiving signal frequency domain vector according to an offset-modulated transmitting signal from a transmitter, and using the receiving signal frequency domain vector and its conjugate vector as a receiver input signal;
    calculating an FDE matrix according to the offset-modulated transmitting signal and a receiver FDE output signal, wherein the FDE matrix is used for performing linear FDE for the receiver input signal, and an FDE output signal is obtained by multiplying the receiver input signal by the FDE matrix; and
    using the FDE matrix to perform FDE for the receiver input signal,
    wherein calculating the FDE matrix comprises obtaining the FDE matrix used for performing linear FDE for the receiver input signal by determining a minimum mean square error between the offset-modulated transmitting signal and the receiver output signal,
    wherein, before calculating the FDE matrix, a channel matrix H between the transmitter and the receiver is obtained through channel estimation, and wherein determining the minimum mean square error between the offset-modulated transmitting signal and the receiver output signal comprises:
    obtaining a mean square error $$\varepsilon = E\left[\left\|\Omega\begin{bmatrix} r \\ r^* \end{bmatrix} - s\right\|^2\right]$$

according to the offset-modulated transmitting signal represented by s and the receiver output signal represented by $$z = \Omega\begin{bmatrix} r \\ r^* \end{bmatrix},$$

wherein $\Omega$ is an FDE matrix, r is a frequency domain vector matrix of a receiving signal, r* is a conjugate matrix of r, and a receiver input signal is $$y = \begin{bmatrix} r \\ r^* \end{bmatrix};$$

and
    obtaining a Single-Carrier Frequency Domain Equalization (SC-FDE) matrix $$\Omega = \begin{bmatrix} HPP^H H^H + N_0 I & HPD_F D_F^T P^T H^T \\ H^* P^* D_F^* D_F^H P^H H^H & H^* P^* P^T H^T + N_0 I \end{bmatrix}^{-1} \begin{bmatrix} HP \\ H^* P(D_F D_F^T)^* \end{bmatrix}$$

applicable to Single-carrier Frequency-Division Multiple Access (SC-FDMA) according to a minimum value of the mean square error $$\varepsilon = E\left[\left\|\Omega\begin{bmatrix} r \\ r^* \end{bmatrix} - s\right\|^2\right],$$

wherein P is a transmitting power matrix of all transmitting signals on a transmitter, $D_F$ is a Fourier transformation matrix of all receiving signals on a receiving side, and $N_0 I$ is a covariance matrix of an additive white Gaussian noise of a channel.

2. A Frequency Domain Equalization (FDE) apparatus, comprising a receiver including a processor configured for:
    obtaining a receiving signal frequency domain vector according to an offset-modulated transmitting signal from a transmitter, and use the receiving signal frequency domain vector and its conjugate vector as a receiver input signal;
    obtaining a channel matrix H between the transmitter and the receiver through channel estimation;
    calculating an FDE matrix according to the offset-modulated transmitting signal and a receiver FDE output signal, wherein the FDE matrix is used for performing linear FDE for the receiver input signal, and an FDE output signal is obtained by multiplying the receiver input signal by the FDE matrix; and
    using the FDE matrix to perform FDE for the receiver input signal, wherein calculating the FDE matrix comprises obtaining the FDE matrix used for performing linear FDE for the receiver input signal by determining a minimum mean square error between the offset-modulated transmitting signal and the receiver output signal, and wherein determining a minimum mean square error between the offset-modulated transmitting signal and the receiver output signal comprises:

obtaining a mean square error $$\varepsilon = E\left[\left\|\Omega\begin{bmatrix}r\\r^*\end{bmatrix} - s\right\|^2\right]$$

according to the offset-modulated transmitting signal represented by s and the receiver output signal represented by $$z = \Omega\begin{bmatrix}r\\r^*\end{bmatrix},$$

wherein $\Omega$ is an FDE matrix, r is a frequency domain vector matrix of the receiving signal, r* is a conjugate matrix of r, and a receiver input signal is $$y = \begin{bmatrix}r\\r^*\end{bmatrix};$$

and an FDE matrix obtaining subunit, configured to: obtain a Single-Carrier Frequency Domain Equalization (SC-FDE) matrix $$\Omega = \begin{bmatrix} HPP^H H^H + N_0 I & HPD_F D_F^T P^T H^T \\ H^* P^* D_F^* D_F^H P^H H^H & H^* P^* P^T H^T + N_0 I \end{bmatrix}^{-1} \begin{bmatrix} HP \\ H^* P(D_F D_F^T)^* \end{bmatrix}$$

applicable to Single-carrier Frequency-Division Multiple Access (SC-FDMA) according to a minimum value of the mean square error $$\varepsilon = E\left[\left\|\Omega\begin{bmatrix}r\\r^*\end{bmatrix} - s\right\|^2\right],$$

wherein P is a transmitting power matrix of all transmitting signals on a transmitter, $D_F$ is a Fourier transformation matrix of all receiving signals on a receiving side, and $N_0 I$ is a covariance matrix of an additive white Gaussian noise of a channel.

* * * * *